UNITED STATES PATENT OFFICE.

GUY E. SHERIDAN AND GEORGE G. GRISWOLD, JR., OF BUTTE, MONTANA.

CONCENTRATION OF ORES.

1,427,235.   Specification of Letters Patent.   Patented Aug. 29, 1922.

No Drawing.   Application filed January 10, 1922.   Serial No. 528,277.

*To all whom it may concern:*

Be it known that we, GUY E. SHERIDAN and GEORGE G. GRISWOLD, Jr., both citizens of the United States, and residing at Butte, county of Silverbow, State of Montana, have invented certain new and useful Improvements in the Concentration of Ores; and we do hereby declare the following to be a full, clear, and exact description of the invention, such as will enable others skilled in the art to which it appertains to make and use the same.

This invention relates to the concentration of ores by flotation, and more particularly to the differential flotation of mixed sulfide ores. The invention has for its object the provision of an improved method of concentrating mixed or complex sulfide ores by differential flotation. More particularly, the invention aims to provide an improved method of concentrating by differential flotation a mixed or complex sulfide ore containing sulfide of iron and one or more metallic sulfides such, for example, as copper, zinc and lead sulfides.

Our present invention contemplates an improved method of treating a complex or mixed sulfide ore containing iron sulfide together with one or more other metallic sulfides whereby the more valuable metallic sulfides may be economically removed by flotation from the ore pulp while the iron sulfide is in large part left behind in the tailings. More particularly, the present invention contemplates the provision of an improved method of treating a complex or mixed sulfide ore containing iron and copper sulfides, with or without one or more other metallic sulfides such as zinc and lead sulfides, whereby the iron and copper sulfides may be economically and effectively separated by differential flotation.

Our present invention is based upon our discovery that by appropriate treatment of a complex or mixed sulfide ore containing iron and copper sulfides, with or without one or more other metallic sulfides, the flotation of the iron sulfide can be in large measure inhibited so as to permit the recovery by differential flotation of a high grade copper concentrate, as well as the recovery of a high grade concentrate or concentrates containing the other metallic sulfides. In general, the invention involves treating the mixed or complex sulfide ore, preferably reduced to a flotatable size, and in the form of ore pulp, with a cyanide and an alkaline salt. We find that the differential flotation contemplated by the invention is in some cases facilitated by heating the ore pulp during the treatment with the cyanide and alkaline salt, and in some instances, particularly in the treatment of an ore containing zinc sulfide, improved results are obtained by the addition of zinc sulfate to the ore pulp.

In carrying out the invention in accordance with our preferred practice, the ore, in a finely divided condition and in the form of an ore pulp containing from 30% to 80% more or less by weight of water, is treated with a cyanide and an alkaline salt or an equivalent alkali or alkali earth hydroxide. An alkali, an alkali earth or a metallic cyanide may be employed in practicing the invention, and the alkaline salt may advantageously be an alkali carbonate or bicarbonate, such, for example, as sodium carbonate or sodium bicarbonate or an alkali hydroxide such as sodium hydroxide. We have found in practice that very satisfactory results are obtained by using from a fraction of a pound to four pounds of an appropriate cyanide per ton of ore and from one to ten pounds of alkaline salt or an equivalent alkali or alkali earth hydroxide per ton of ore. The cyanide and alkaline salt are thoroughly mixed with the ore pulp in any appropriate mixing apparatus, and we prefer to carry out this mixing operation as a preliminary step to the flotation treatment proper. To this end, we prefer to thoroughly incorporate the cyanide and alkaline salt or an equivalent alkali or alkali earth hydroxide with the ore pulp in an appropriate mixing or agitation tank, whereupon the ore pulp, further diluted with water if necessary or desirable, is introduced into a flotation cell or apparatus of any of the well known types. The flotation treatment is conducted in the presence of an appropriate flotation agent, such as oil.

We find that the effectiveness of the treatment of the ore with the cyanide and alkaline salt is in some cases enhanced by heating the ore pulp. To this end, the ore pulp may be heated as high as 212° F, although we find a temperature of from 120°–180° F. very satisfactory. The treatment of the ore pulp with the cyanide and alkaline salt, preferably heated as just described, may continue for a period of time ranging from two minutes to several hours depending upon the character of the ore. The ore pulp is then preferably diluted with cold water until the temperature of the pulp is approximately 130° F. A suitable small amount of an appropriate flotation or frothing agent, such as oil, is then added to the ore pulp, and the ore pulp is then subjected to a flotation treatment in the course of which the flotation of the iron sulfide in the ore is in large part prohibited.

In the case of a complex or mixed sulfide ore containing zinc sulfide, we find it of advantage to add from a fraction of a pound up to four pounds of zinc sulfate or equivalent salt, per ton of ore, during the treatment of the ore pulp with the cyanide and alkaline salt as aforementioned.

The method of the present invention is of particular advantage in the concentration by differential flotation of a mixed or complex ore containing copper and iron sulfides, or containing copper, zinc and iron sulfides, or containing copper, zinc, lead and iron sulfides. In the case of an ore containing only copper and iron sulfides in substantial amounts, the method of the invention enables the recovery by flotation of a high grade copper concentrate, the iron sulfide being thereby largely concentrated in the tailings. Where the ore also contains zinc or lead sulfide, or both, it is possible, in practicing the present invention to recover by differential flotation two or more distinct flotation products in which the copper, zinc and/or lead sulfides will be differentially concentrated.

Where the ore under treatment contains only the sulfides of copper and iron, we find that the flotation of the iron sulfide is effectively inhibited by the aforementioned treatment with an appropriate cyanide in a neutral or alkaline pulp. In the treatment of such an ore, it may, accordingly, be unnecessary where the ore pulp is neutral or alkaline to employ an alkaline salt in conjunction with the cyanide. In case the ore contains both lead and zinc sulfides, the presence of the alkaline salt is important for inhibiting the flotation of the zinc sulfide so as to permit the recovery by differential flotation of a lead concentrate. The copper in such an ore may follow the lead or the zinc depending upon the form in which the copper is present in the ore. Thus, we find that when the copper is present in the ore in the form of chalcopyrite it is removed with the lead sulfide, but when it is present in the ore in the form of chalcocite or covellite, it is removed with the zinc sulfide. Chalcopyrite is more readily amenable to flotation than the other forms of copper sulfide minerals and while there is a marked difference in the amenability to flotation of the various copper sulfides, the process of the invention makes it possible to separate the copper and iron sulfides by differential flotation irrespective of the presence in the ore of the sulfides of lead and zinc.

The action of the cyanide upon the iron sulfide appears to be to deaden the iron sulfide by coating the particles thereof with a very thin film, probably of a complex cyanide of some form or other. The alkaline salts, or equivalent alkali or alkali-earth hydroxides, which are used in accordance with our invention in combination with the cyanide tend to convert the coating on the iron sulfide particles into the hydrated oxide of iron, and we find that the flotation of the iron sulfide is thereby very effectively inhibited. The cyanide and alkaline salt also tend to inhibit the flotation of zinc sulfide, but have no such inhibiting effect upon lead sulfide. Thus, in the practice of the invention, the lead sulfide may be removed by differential flotation with or without the copper sulfide depending, as hereinbefore explained, upon whether or not the copper sulfide in the ore tends to follow the lead or the zinc.

The action of the cyanide and alkaline salt in inhibiting the flotation of zinc sulfide, and copper sulfide where the copper follows the zinc, is neutralized by treatment with caustic soda or other appropriate alkali, without at the same time neutralizing or negativing the inhibitory action of the cyanide and alkaline salt with respect to the iron sulfide. Thus, in the treatment of an ore containing lead, zinc, copper and iron sulfides, the lead sulfide may be first removed by differential flotation, and the ore pulp remaining after this flotation operation may then be treated with caustic soda or equivalent alkali and the zinc then removed by differential flotation leaving the iron sulfide in the tailings. The copper will follow the lead or zinc depending upon the condition in which it is present in the ore as hereinbefore explained.

The practice of the invention will be illustrated by the following examples:

1. A charge of ore, ground through 65 mesh, was agitated in a flotation cell with an equal amount of water (by weight) for two minutes at a temperature of 160° F. with five pounds of sodium bicarbonate and one pound of sodium cyanide per ton of ore. Two pounds of sodium hydrate were then added, and the agitation continued over two minutes. After appropriate dilution of the ore pulp with water, oil was added and a copper-zinc concentrate was obtained by a flotation treatment. The results of this run are indicated in the following tabulation:

| Product. | Per cent of total. | Assay. | | | Per cent of recovery. | | |
|---|---|---|---|---|---|---|---|
| | | Per cent Cu. | Per cent Fe. | Per cent Zn. | Cu. | Fe. | Zn. |
| Head | 100.0 | 3.44 | 13.9 | 4.1 | 100.0 | 100.0 | 100.0 |
| Concentrate | 20.1 | 15.64 | 12.6 | 20.2 | 91.2 | 18.2 | 100.0 |
| Tailing | 79.9 | 0.38 | 14.2 | tv | 8.8 | 81.8 | |
| Total | | | | | 100.0 | 100.0 | 100.0 |

In the foregoing example, the sodium cyanide and sodium bicarbonate treatment was such as to inhibit the flotation of the zinc and iron sulfides, but this inhibitory action with respect to the zinc sulfide was subsequently neutralized by the treatment with sodium hydrate, without affecting the inhibitory action with respect to the iron sulfide, so that in the subsequent flotation operation both the copper and zinc sulfides were obtained in the resulting overflow froth while the iron sulfide in large part remained behind in the tailings.

2. This example illustrates the differential separation by flotation of copper, zinc, lead and iron sulfides in a copper-lead-zinc-iron sulfide ore. A charge of ore, ground through 65 mesh, was agitated in a flotation cell with an equal amount of water for two minutes at a temperature of 150° F. with five pounds of sodium bicarbonate, two pounds of zinc sulfate and one pound of sodium cyanide per ton of ore. The ore pulp was then diluted to the proper density, oil added, and a lead-copper concentrate obtained by the flotation operation. Two pounds of sodium hydrate were then added to the remaining ore pulp, the mixture agitated for two minutes, and, after a further addition of oil, a zinc concentrate was obtained by flotation, leaving the bulk of the iron sulfide in the tailings. The zinc concentrate was then given a cleaning treatment in another flotation cell, in order to raise the grade of the concentrate. The products from this last flotation operation are designated in the following table as "zinc cleaner concentrate", and "zinc cleaner tail". The results of this run are indicated in the following tabulation:

| Product. | Per cent of total. | Assay. | | | |
|---|---|---|---|---|---|
| | | Per cent Cu. | Per cent Fe. | Per cent Zn. | Per cent Pb. |
| Head | 100.0 | 1.86 | 15.2 | 7.1 | 12.5 |
| Pb Conc. | 21.0 | 5.86 | 6.6 | 6.6 | 50.5 |
| Zn C. Conc. | 10.8 | 3.52 | 6.7 | 43.1 | 9.0 |
| Zn C. Tail | 6.4 | 3.28 | 17.6 | 13.2 | 6.77 |
| Tailing | 61.8 | 0.10 | 18.1 | 0.1 | 0.62 |
| Total | 100.0 | | | | |

| Product. | Per cent of total. | Per cent of recovery. | | | |
|---|---|---|---|---|---|
| | | Cu. | Fe. | Zn. | Pb. |
| Head | 100.0 | 100.0 | 100.0 | 100.0 | 100.0 |
| Pb Conc. | 21.0 | 65.4 | 9.6 | 19.9 | 85.6 |
| Zn C. Conc. | 10.8 | 20.2 | 5.0 | 67.0 | 7.8 |
| Zn C. Tail | 6.4 | 11.1 | 7.8 | 12.1 | 3.5 |
| Tailing | 61.8 | 3.3 | 77.6 | 1.0 | 3.1 |

In this example, zinc sulfate is employed in order to prevent the zinc sulfide in the ore from floating with and contaminating the lead product.

3. This example illustrates the application of the invention to an ore containing only copper and iron sulfides. A charge of ore was ground wet (through 80 mesh) with three pounds of sodium bicarbonate and one pound of sodium cyanide per ton of ore. The resulting ore pulp was placed in a flotation apparatus at a temperature of 113° F. and, after the addition of oil, a copper concentrate was obtained by differential flotation. The results of this run are indicated in the following tabulation:

| Product. | Per cent of total. | Assay. | | Per cent of recovery. | |
|---|---|---|---|---|---|
| | | Per cent Cu. | Per cent Fe. | Cu. | Fe. |
| Head | 100.0 | 6.22 | 12.3 | 100.0 | 100.0 |
| Concentrate | 21.8 | 27.0 | 16.7 | 94.7 | 29.6 |
| Tailing | 78.2 | 0.56 | 11.2 | 7.0 | 71.2 |
| Total | | | | 101.7 | 100.8 |

4. This example illustrates the application of the invention to an ore containing only copper and iron sulfides, in which an alkali hydroxide is used as the equivalent of an alkaline salt. A charge of ore was ground wet (through 80 mesh) with two pounds of sodium hydroxide and one pound of sodium cyanide per ton of ore. The resulting ore pulp was placed in a flotation apparatus at a temperature of 55 deg. F., and after an addition of oil, a copper concentrate was obtained by differential flotation. The greater part of the iron remained in the tailing. The results of this run are indicated in the following tabulation:

| Product. | Per cent of total. | Assay. | | Per cent of recovery. | |
|---|---|---|---|---|---|
| | | Per cent Cu. | Per cent Fe. | Cu. | Fe. |
| Head | 100.0 | 6.22 | 12.3 | 100.0 | 100.0 |
| Concentrate | 20.8 | 27.12 | 14.9 | 90.7 | 25.2 |
| Tailing | 79.2 | 0.66 | 11.7 | 8.5 | 75.3 |
| Total | 100.0 | | | 99.2 | 100.5 |

In the appended claims, it is to be understood that we intend the expression "alkaline salt" to include equivalent alkali and alkali-earth hydroxides.

The present invention is applicable to ores, concentrates, tailings, and other metallurgical products, for which the term "ore" is used throughout this specification and the appended claims.

In our copending application, Serial No. 437,030, filed January 13, 1921, we have described and claimed a process of concentrating by flotation an ore containing lead sulfide and one or more other metallic sulfides including iron sulfide which comprises treating the ore with a cyanide and an alkaline salt and subjecting the so treated ore to a flotation operation whereby the lead sulfide is in large part recovered in the resulting froth and the flotation of the iron sulfide is in large part inhibited. The invention claimed in our aforementioned application relates to the treament of an ore containing lead sulfide, whereas our present invention, in one of its aspects, is directed more broadly to the treatment of a complex or mixed sulfide ore containing iron sulfide but not necessarily containing lead sulfide. More specifically the present invention relates to the treatment of a complex or mixed sulfide ore containing both iron and copper sulfides, with or without recoverable amounts of lead sulfide.

We claim:

1. The process of concentrating by flotation an ore containing sulfides of iron together with one or more other metallic sulfides which comprises treating the ore with a cyanide and an alkaline salt and subjecting the so treated ore to a flotation operation in which the flotation of the iron sulfide is in large part inhibited.

2. A process of concentrating by flotation an ore containing sulfides of copper and iron which comprises treating the ore with a cyanide and an alkaline salt and subjecting the so treated ore to a flotation operation whereby the copper sulfide in the ore is in large part recovered in the resulting overflow froth and the flotation of the iron sulfide in the ore is in large part inhibited.

3. A process of concentrating by flotation an ore containing copper and iron sulfides which comprises treating the ore with a cyanide and a soluble carbonate, and subjecting the so treated ore to a flotation operation and thereby recovering the copper sulfide in large part in the resulting overflow froth while the flotation of the iron sulfide is in large part inhibited.

4. A process of concentrating by flotation an ore containing sulfides of copper, zinc and iron, which comprises treating the ore with a cyanide and an alkaline salt, subsequently treating the ore in the form of an ore pulp with an alkali, and subjecting the thus treated ore pulp to a flotation operation and thereby effecting in large part the flotation of the copper and zinc sulfides while inhibiting in large part the flotation of the iron sulfide.

5. A process of concentrating by flotation an ore containing sulfides of copper, zinc and iron which comprises subjecting the ore in the form of an ore pulp to the action of an alkali cyanide and an alkali carbonate, subsequently treating the ore pulp with an alkali, and subjecting the thus treated ore pulp to a flotation operation and thereby effecting in large part the flotation of the copper and zinc sulfides while inhibiting in large part the flotation of the iron sulfide.

6. A process of concentrating by flotation an ore containing lead, copper, zinc and iron sulfides which comprises subjecting the ore in the form of an ore pulp to the action of a cyanide and an alkaline salt, subjecting the so-treated ore pulp to a flotation operation and thereby effecting the flotation in large part of the lead sulfide while inhibiting in large part the flotation of the zinc and iron sulfides, treating the remaining ore pulp with an alkali, subjecting the thus treated remaining ore pulp to a flotation operation and thereby effecting the flotation in large part of the zinc sulfide while inhibiting in large part the flotation of the iron sulfide, and recovering the copper sulfide in the ore in either the aforementioned lead or zinc flotation concentrate according to the amenability to flotation of the copper sulfide in the ore.

In testimony whereof we affix our signatures.

GUY E. SHERIDAN.
GEORGE G. GRISWOLD, Jr.